Figure 1:
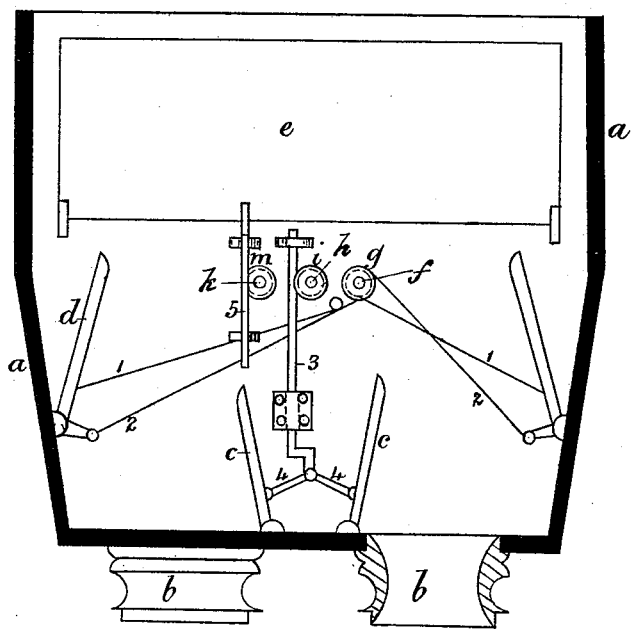

(No Model.)

J. B. FERRY.
STEREOSCOPE.

No. 366,823. Patented July 19, 1887.

Witnesses:
J. A. Rutherford
Robert Orwett

Inventor:
Joseph B. Ferry,
By James L. Norris
Atty.

(No Model.) 2 Sheets—Sheet 2.

J. B. FERRY.
STEREOSCOPE.

No. 366,823. Patented July 19, 1887.

Witnesses:
J. A. Rutherford
Robt. Everett

Inventor:
Joseph B. Ferry,
By James L. Norris,
Atty.

UNITED STATES PATENT OFFICE.

JOSEPH BULL FERRY, OF MARTIN, NEAR LINCOLN, COUNTY OF LINCOLN, ENGLAND.

STEREOSCOPE.

SPECIFICATION forming part of Letters Patent No. 366,823, dated July 19, 1887.

Application filed May 7, 1887. Serial No. 237,433. (No model.) Patented in England May 21, 1886, No. 6,848.

*To all whom it may concern:*

Be it known that I, JOSEPH BULL FERRY, a subject of the Queen of Great Britain, vicar of and residing at Martin, near Lincoln, in the county of Lincoln, England, clerk in Holy Orders, have invented certain new and useful Improvements in Appraratus for Viewing Pictures or other Objects, (for which I have obtained a patent in Great Britain, No. 6,848, bearing date May 21, 1886,) of which the following is a specification.

The object of this invention is to manufacture an improved apparatus for the purpose of assisting in viewing pictures and other objects by excluding all extraneous matter from the sight, and thereby confining the observation to the picture or other object to be viewed, and guarding each eye from seeing more or less than the other.

The invention consists of a box or case, preferably formed externally in a similar manner to the stereoscope, having apertures for the eyes of the observer, but having no lenses or other glasses. Internally the invention differs from the stereoscope in being provided with doors or shutters mounted on pivots or swing-hinges and made capable of being adjusted at suitable angles. One pair of doors is fitted horizontally, the inner edges nearest to the observer's eyes being mounted on pivots or hinges and the outer edges being free to take the desired inclination. These horizontal doors are used to reduce or enlarge the extent of vision in a vertical direction. Between these doors and the sight-apertures, and near the sides of the case, a pair of vertical doors are mounted in a similar manner at right angles to the first-mentioned doors, and capable of regulation so as to reduce or enlarge the extent of vision in a horizontal direction. A third pair of doors are fitted on vertical pivots or hinges between the eye-sockets or sight-apertures, which limit or adjust and regulate the inner or cross lines of sight and govern the meeting-points of such lines with the outer lines of sight, as regulated by the secondly-mentioned pair of doors, making such meeting-points near or distant, as desired. Thus the right eye is prevented from seeing farther to the left than the limit of vision of the left eye in that direction, and the left eye is, in like manner, prevented from seeing farther to the right than the limit of vision of the right eye in that direction.

The movement of each pair of doors is so effected that their outer edges simultaneously approach toward or recede from each other, so that their angles with the central axis are at all times equal and opposite. This result is obtained by means of suitable screws, studs, levers, connecting-links, cords, and equivalent devices, whereby their approach to or departure from an angle of inclination with the axial line is at all times under perfect control.

My invention is capable of much modification in arrangement, materials, and other details.

In order that my said invention may be particularly described and ascertained, reference is hereby made to the accompanying drawings, in which similar letters and figures of reference indicate corresponding parts.

Figure 2:
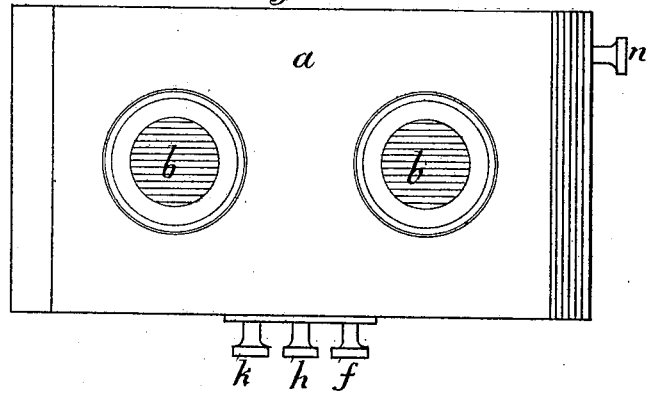
Figure 3:
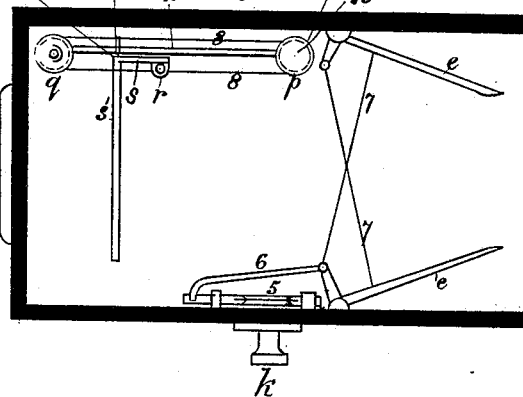
Figure 4:
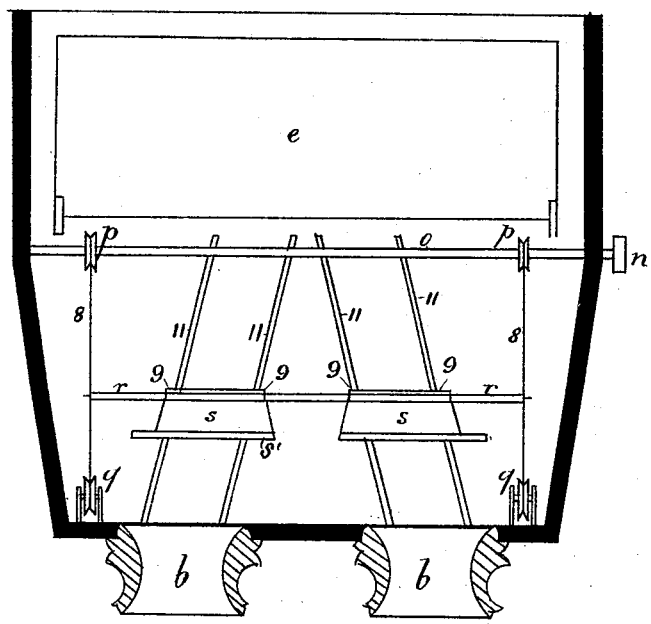
Figure 5:
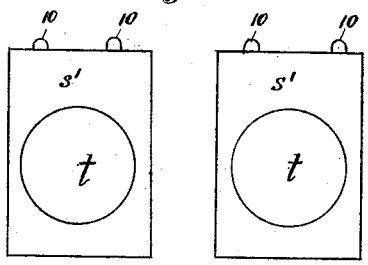

Figure 1 is a horizontal section; Fig. 2, a front view, and Fig. 3 a longitudinal vertical section; and Figs. 4 and 5 are further views of my invention, Fig. 4 being a view of the under side of the top of the case with its fittings, and Fig. 5 an elevation of the two sliding plates with circular openings.

$a$ is the outer case. $b\,b$ are the sight-holes. $c\,c$ are the front vertical shutters. $d\,d$ are the back vertical shutters, and $e\,e$ are a pair of horizontal shutters. The shutters $c$ and $d$ are omitted in Fig. 3 for greater clearness. The front edges of all the shutters are hinged to the case, as shown in the drawings.

One method of operating each pair of shutters simultaneously is shown in the drawings.

$f$ is a milled head attached to a spindle which carries the grooved wheel $g$. This wheel is fitted with cords 1 1 2 2, which govern the positions of the shutters $d\,d$.

$h$ is a milled head attached to a spindle which carries the grooved wheel $i$. This wheel is fitted with a cord which actuates the bar 3. This bar has two small connecting-rods, 4 4, which govern the positions of the shutters $c\,c$.

$k$ is a milled head attached to a spindle which carries the grooved wheel $m$. This wheel is fitted with a cord which actuates the bar 5.

This bar governs the positions of the shutters e e—first, by means of the connecting-rod 6, and, secondly, by means of the cords 7 7, which insure corresponding movements.

$n$ is a milled head attached to the spindle $o$, which carries two grooved wheels, $p\ p$. These wheels are fitted with cords 8 8, which pass round the tension-wheels $q\ q$. The cords 8 8 are attached to the traveling-bar $r$.

$s\ s$ are two plates fitted with staples 9 9, which slide upon the bar $r$ when moved thereby. The plates $s\ s$ also carry staples 10 10, which slide upon guide-wires 11 11. The plates $s\ s$ carry the vertical plates $s'\ s'$, in which circular sight-holes $t\ t$ are formed.

There are two pairs of the wires 11 arranged horizontally in the top of the case and converging toward the rear thereof. The plates $s$, which carry the vertical plates $s'$, are horizontal, and they are provided with the eyes or staples 9, loosely encircling the transverse bar $r$, and with the eyes or staples 10, that loosely encircle the horizontal wires 11, (see Fig. 3;) hence, if the milled head $n$ be turned in the proper direction, the plates $s\ s'$ will be advanced on wires 11 toward the sights $b\ b$, and in such advancement the plates $s\ s'$ will, by the divergence of wires 11, be moved apart on the bar $r$. If the milled head $n$ be turned in the other direction, the plates $s\ s'$ will be adjusted on the wires 11 away from the sights $b$, and by the convergence of said wires 11 the plates will be moved toward each other on the bar $r$. When the plates are moved up close to the sights $b$, their effect is entirely neutralized, and by adjusting the plates at various distances from the sights, as described, they effect the limitation of the vision accordingly.

By the above-described or any other suitable means the shutters can be opened or closed, as desired, and the range and direction of vision adjusted.

Although I have shown convenient methods of operating the shutters, I wish it to be understood that I do not confine myself to those methods and means, as any other suitable means may be used for effecting the same object, nor do I confine myself to the exact form of apparatus shown in the drawings, as the construction may be very much varied.

Having now particularly described and ascertained the nature of my said invention and in what manner the same is to be performed, I declare that what I claim is—

1. The combination, with the case having sight-openings, of the vertical shutters $d$, pivoted in the case at one end, rear horizontal shutters, $e$, pivoted in the case, and means for swinging the shutters to and from each other, substantially as described.

2. The combination, with the case $a$, having the sights $b\ b$, of the front vertical shutters, $c\ c$, pivoted between the sights, and means for swinging the said shutters to regulate the inner or cross lines of sight, substantially as described.

3. The combination, with the case $a$, having sights $b\ b$, of a pair of vertical shutters, $c$, pivoted between the sights, a pair of pivoted shutters, $d$, pivoted at the sides of the case, and means for swinging the shutters, substantially as described.

4. The combination, with the case $a$, having sights $b$, of a pair of front vertical shutters, $c$, pivoted between said sights, a pair of rear horizontal pivoted shutters, $e$, a pair of shutters, $d$, pivoted at the sides of the case between the front and rear shutters, and means for independently swinging each pair of shutters, substantially as described.

In testimony whereof I have hereunto set my hand this 11th day of March, 1887.

JOSEPH BULL FERRY.

Witnesses:
EDWD. B. GEORGE,
92 Monks' Road, Lincoln, Notary's Clerk.
WM. DEANE,
42 Melville Street, Lincoln, Notary's Clerk.